a

RECESSED TREAD WEAR INDICATOR

BACKGROUND OF THE INVENTION

1. Field of the Invention

This invention relates generally to tires and more particularly, to tire tread wear indicators.

2. Description of the Related Art

It is known how to provide wear detectors on the tread pattern elements of a tire tread for motor vehicles. One example of a tread wear indicator is shown in FIGS. 1A-C. A tread band 10 includes grooves 13 opening from the front face of the tread band 10, these grooves 13 forming the treads of the tread band 10. Wear indicators 11 are molded into the grooves 13 at a depth m 12, which represents the minimum acceptable depth of the tread grooves 13. FIG. 1B shows the tread band 13 worn down to the wear indicators 11, indicating that the tread band 10 has served its useful life. FIG. 1C is a perspective view of the tread band 10 showing that the tread wear indicators 11 are generally located at the same circumferential location along the tread band 10 so that when the tread is worn down to the wear indicators 11, a wear bar 14 is formed laterally across the tread band 10, which indicates that the useful life of the tread is ended. The undertread 16 portion of the tread band 10 is that portion that is below the bottom of the grooves 13 that are formed in and open to the front face 17 of the tread band 10.

Other examples, of tread wear indicators may be found, for example, in the British patent publications GB-A-2 330 808 and GB-A-2 268 715. These references disclose visual wear detectors consisting of layers of colored light-reflecting rubber that are disposed over the entire circumference of the tire in the mass of the tread. These colored rubber indicators become visible following a given amount of wear on the tire that strips away the rubber covering the colored rubber layers.

Tread bands are used for retreading tires as well as in new tire construction. In either case, the tread band is bonded to a tire casing to provide either a new tire (when bonded to a new tire casing) or a retread tire (when bonded to a used tire casing that has had the old tread buffed off). The tread bands are molded and may be either cured or uncured before being bonded to the tire casing.

The undertread portion of the tread band is typically 2-5 mm thick and may facilitate demolding the tread band. It may further assist in resisting lateral compression of the tread pattern during the process of bonding the tread band to the tire casing. However, this undertread does not provide any useful life for the tread because it lies below the tread grooves that open to the front face of the tread band.

While wear bars are useful indicators of the end of the useful life for the tread, there is a need for improved tread wear indicators that maximize the use of the entire tread band before its end of life.

SUMMARY OF THE INVENTION

One embodiment of the present invention includes a tread band having a primary groove opening onto a front face of the tread band, a secondary feature molded into the tread band, and a wear indicator molded into a section of an undertread portion of the tread band. The wear indicator is useful for providing an end-of-useable tread indication when the front face of the tread band wears even with a top portion of the wear indicator. Furthermore, the secondary feature may be characterized as opening onto a back face of the tread band, a side face of the tread band or combinations thereof.

In particular embodiments of the present invention, the section of the undertread portion may extend less than about 4 mm or less than about 3 mm from the back face of the tread band. In other embodiments, the section of the undertread portion may extend less than about 1.5 mm from the back face of the tread band.

The tread band of the present invention further includes embodiments wherein the wear indicator extends radially from the back face of the tread band and is molded into an indicator portion of the secondary feature.

The present invention further provides embodiments that include a tire having a tire carcass having a crown portion with a tread band bonded to the crown portion, the tread band having the features described above. Particular embodiments of the present invention include tires that are new as well as tires that are re-treaded with a tread band as described above.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION OF PREFERRED EMBODIMENTS

Figure 1A:
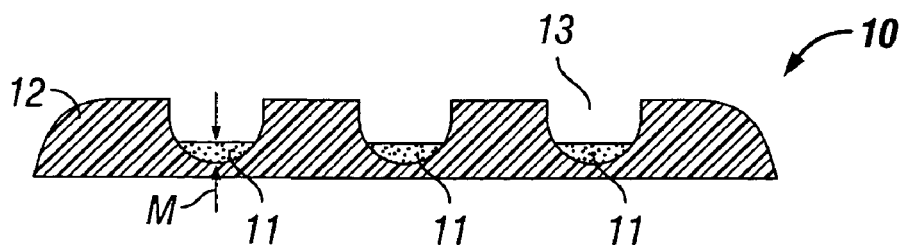
FIGS. 1A-C are drawings showing cross sectional and perspective views of a tread band showing a wear bar as known in the prior art.
Figure 1B:
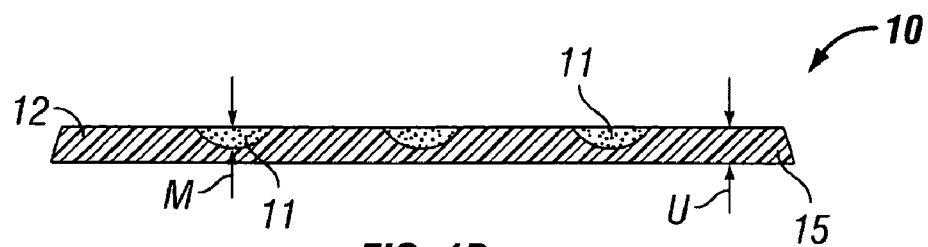
Figure 1C:
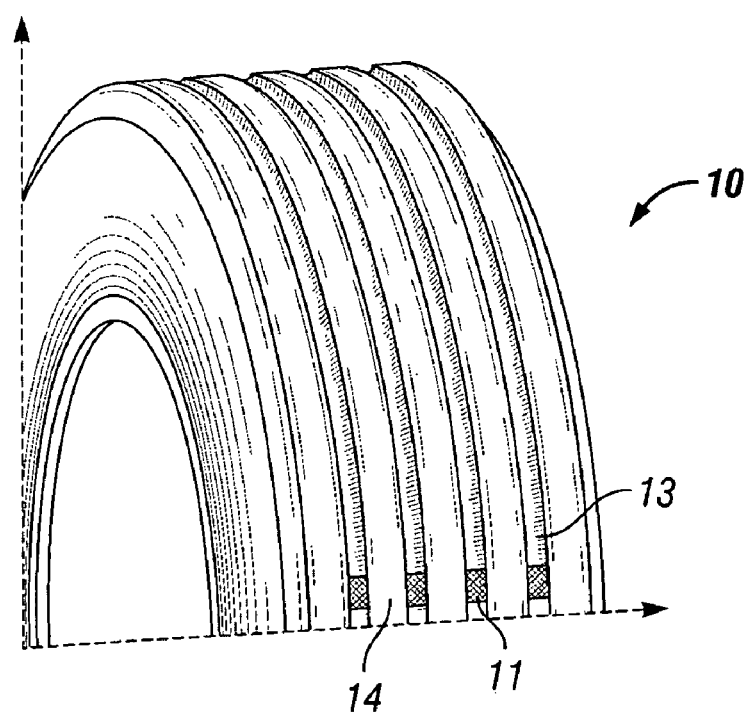

The present invention provides a wear indicator molded into the undertread portion of a tread band to provide an end-of-usable-tread indication. Such indication is provided when the front face of the tread band wears even with a top portion of the wear indicator. The tread band includes both a primary feature that opens onto a front face of the tread band and at least one secondary feature molded into the tread band that opens onto a back face of the tread band, a side face of the tread band or combinations thereof. Primary and secondary features may include, for example, sipes, holes and/or grooves as known to those having ordinary skill in the art.

Treads on tires reach an end-of-usable tread when the total tread depth provided by the features that are open to the front face of the tread are below an acceptable minimum depth or below an acceptable total volume. Such minimum depth and/or volume may be set by regulation in a given jurisdiction or alternatively, may be determined by the tire designer.

The wear indicator of the present invention is molded into the undertread portion of the tread band to provide an end-of-usable-tread indication for the secondary features. Since the secondary features are molded into the tread band and are open to the sides and/or back of the tread band, these secondary features do not provide usable tread depth or volume until the front face is worn to a depth that opens the secondary features to the front face. As the primary features that are open to the front face wear away, the secondary features become exposed and open to the front face to provide the required open volume and/or depth in the tread. This allows the tread band to be worn much closer to the rear face of the tread band, allowing more of the tread band to be utilized before the tire is discarded or retreaded. Preferably the wear indicator is molded into a section of the undertread portion, the section extending less than about 4 mm from the back face of the tread band. More preferably the section may extend less than about 1.5 mm from the back of the tread band. Alternatively, the section may extend less than about 3 mm from the back face of the tread band. It should be noted that since the tread band is typically bonded to a tire carcass, the "radial" direction of the tread band as used herein is in the perpendicular direction between the front face and the back face of the tread band.

As disclosed above, the wear indicator that is molded into the tread band provides an end-of-usable-tread indication when the front face of the tread band wears even with a top portion of the wear indicator. The top portion of the wear indicator may be, for example, a front or top solid face of the molded indicator or the top or front of a void space molded into the tread band. For example, a series of small perforations may be molded into a section of the undertread in a pattern that spells out "WORN." When the front face of the tread band is worn to that section of the undertread, the "WORN" indication will become visible, thereby providing the end-of-usable-tread indication. Solid wear indicators may be characterized as "positive" indicators and wear indicators that consist of voids may be characterized as "negative" indicators. However, whether the indicators are positive or negative indicators, the indication provided to the user of the tires is the same, i.e., that the end-of-useable-tread has been reached.

In a particular embodiment of the present invention, the wear indicator extends radially from the back face of the tread band to a predetermined minimum tread depth and is molded into a portion of one or more secondary features that open onto a back or side face of a tread band.

In another particular embodiment, the top surface of the wear indicator is exposed in a cavity that extends from the front face of the tread band to below the top face of the wear indicator. When the tread wears down to expose the wear indicators, the end of the useful life of the tread band is indicated. Advantageously, the wear indicator of the present invention is typically located in the undertread of the primary features that open onto the front face of the tread band so that a greater amount of the undertread can be utilized as useful tread, thereby extending the useful life of the tread band.

Particular embodiments of the present invention include a tread band that may be bonded either to a new tire casing or to a used tire casing. Bonding the tread band to a used tire casing that has had the old tread buffed off is part of the retread process. The tread band is molded with features that are formed by both the top and bottom sections of the mold. The top mold section molds one or more primary features that are open to the front face of the tread band and the bottom mold section molds one or more secondary features that are open to the back face of the tread band. Optionally, other secondary features may be molded by other molding elements, i.e., molds that interact with the top and bottom mold sections to form a complete mold as known to those having ordinary skill in the art, to form features that, for example are open to one or more sides of the tread band.

In particular embodiments of the present invention, the bottoms of the one or more secondary grooves extend to a greater distance radially from the back face of the tread band than the groove bottoms of the one or more primary grooves. This arrangement allows, during the wearing of the tire, the secondary grooves to open to the front face of the tread band and thereby provide useable features as the primary grooves wear away. It should be noted that the "bottom" of a feature is typically opposite the open end of the feature.

Since the secondary features provide tread for use after the primary features have worn away, placing the wear indicator in a portion of the bottom of the primary features does not provide an indication of the minimum tread remaining. Placing the wear indicator in a portion of the primary feature bottoms would provide the end-of-usable-tread indication long before the tread was worn to its minimum acceptable depth because it does not take into account the additional tread life that is added by utilizing the secondary features.

In particular embodiments of the present invention, the wear indicator extends radially from the back face of the tread band to a predetermined minimum secondary feature depth such that the top portion of the wear indicator lies below the bottom of the primary features. In this manner, as the tread continues to wear past the primary and into the secondary features, the wear indicator provides the desired end-of-useful-tread indication as the secondary features are worn to their minimum acceptable depth. In a particular embodiment, the wear indicator may be molded into a portion of the bottoms of the secondary grooves, preferably at the same circumferential location so that as the wear indicators become exposed, they form a wear bar laterally across the face of the tread band. Alternatively, the wear bar may be molded into the bottom of a cavity that opens onto the top surface of the tread band.

Particular embodiments of the present invention further include an access channel opening from the front face of the tread band and extending radially to a top face of a wear indicator that extends radially from the back of the tread band. If the wear indicator is molded into a portion of a secondary feature, then preferably the wear indicator is surrounded by barriers, thereby forming a chamber surrounding the wear indicator. The walls that separate the wear indicator from the secondary feature are typically flashing.

The access channel provides access with a measurement device to ascertain that the wear indicator is at the correct depth to indicate the minimum tread depth when showing. Additionally, the access channel provides a visual indication of the tread wear. The observable presence of the access channel provides a visual indication that the tire has not worn to its minimum acceptable tread depth. After the access channel has been worn away through normal tread wear during use of the tire, the wear indicator becomes visible, thereby providing a visual indication as to whether the tire has reached its end-of-useable tread condition.

Although the access channel may typically be shaped as a square, there is no limitation as to the acceptable shapes for the access channel. For example, the access channel may be circular, oval, rectangular, triangular, any other regular or irregular polygon shape or combinations thereof. Furthermore, the access channel may be, without limitation, between about 2 mm and 12 mm wide or preferably, between about 4 mm and 6 mm wide.

Particular embodiments of the present invention further include both new and retread tires. Such tires include a tire carcass having a crown portion and a tread band as described above that is bonded to the crown portion of the tire carcass. As known to those having ordinary skill in the art, the tread band may be either cured or uncured when first stitched to the crown portion of the tire carcass. If cured, then the tread band is stitched to the crown portion of the tire carcass with, for example, cushion gum and then cured so that the cushion cum bonds the tread band securely to the crown. If uncured, then the tread is cured after being stitched to the crown.

Figure 2A:
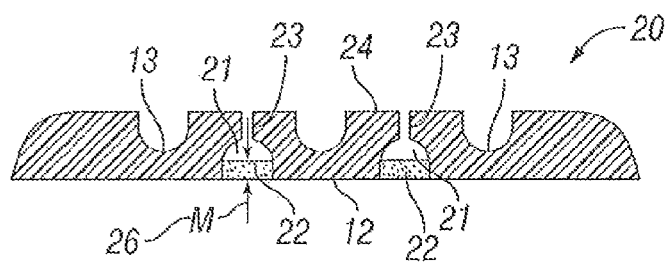
FIGS. 2A-2B are drawings showing cross sectional views of a tread band having a wear indicator extending radially from the back face of the tread band and molded into the secondary grooves in accordance with a particular embodiment of the present invention.
Figure 2C:
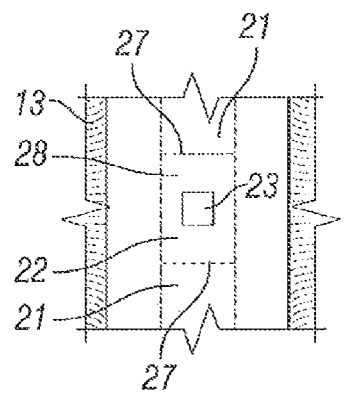
FIG. 2C is a top view of a portion of the tread band having the wear indicator of FIGS. 2A-2B.
Figure 2B:
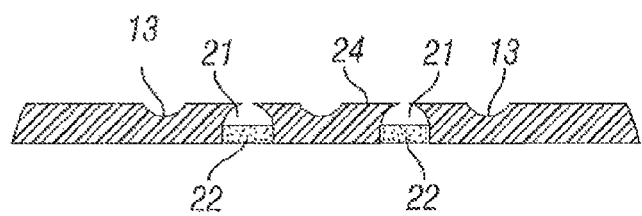

FIGS. 2A-2B are cross sectional views of a tread band having a wear indicator extending radially from the back face of the tread band and molded into the secondary grooves and FIG. 2C is a top view of a portion of the tread band having the wear indicator. FIG. 2A includes the tread band 20 having a set of primary grooves 13 that open onto the front face 24 of the tread band 20 and a set of secondary grooves 21 that open onto the back face 12 of the tread band 20. The wear indicator 22 is molded into a portion of the bottoms of the secondary grooves 21 and the wear indicator 22 extends radially from the back face 12 of the tread band 20 to the minimum groove depth m 26. An access channel 23 is open from the front face 24 of the tread band 20 to the secondary grooves 21. The access channel 23 provides access for a measuring device to measure the depth of the wear indicator 22. The access channel 23 further provides a visual indication that the tread depth has not reached the minimum acceptable depth because as long as the open access channel 23 is visible, the wear indicator 22 has not been reached.

FIG. 2B is a cross sectional view of the tread band shown in FIG. 2A after the band has been worn and the primary grooves 13 have nearly worn away. The bottoms of the secondary grooves 21 are shown opening to the top face 24 of the tread band 20 to provide useful tread to replace the worn primary grooves 13. The wear indicator 22 becomes visible through the opening into the secondary grooves 21 to a person inspecting the tire. It should also be noted that at this point, the access channel 23 has worn away and is no longer necessary since the wear indicator 22 is visible through the bottom of the secondary grooves 21.

FIG. 2C is a top view of a portion of the tread band having the wear indicator as shown in FIGS. 2A-2B. The wear indicator 22 is molded into the secondary groove 21 and barriers 27 are formed within the secondary groove 21 to isolate the wear indicator 22 from the adjacent portions of the secondary groove 21. The barriers 27 may be flashing deposited within the secondary grooves during the molding process or alternatively, may be a molded feature. The barriers 27 prevent moisture and dirt from passing through the access channel 23 into the secondary groove 21.

Figure 3A:
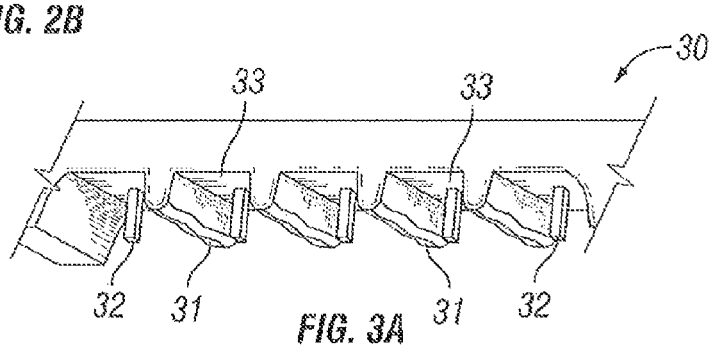
FIGS. 3A-3B are drawings showing perspective views of a top and bottom mold suitable for molding a tread band having a wear indicator molded into the secondary grooves.
Figure 3B:
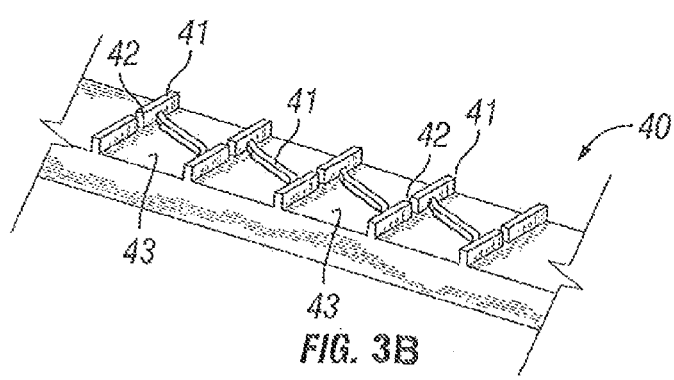

FIGS. 3A-3B are perspective views of a top and bottom mold forms suitable for molding a tread band having a wear indicator molded into the secondary grooves. It should be noted that the solid portions on the interior of the mold will result in rubber-free portions in the molded tread band while the void portions of the interior of the mold will result in solid rubber portions in the molded tread band.

The top mold form 30 shown in FIG. 3A provides the primary groove form 31 and the access channel form 32 for molding the primary grooves 13 and the access channels 23 as shown in FIG. 2A. The top mold form 30 further provides the front face form 33 that forms the front face 24 of the molded tread band.

Figure 3C:
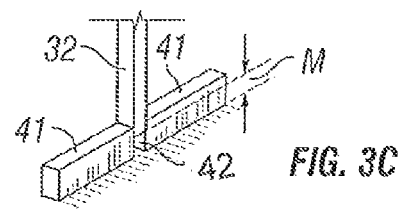
FIG. 3C is a drawing of a perspective view of a detail of the wear indicator portions of the top and bottom molds that are shown in FIGS. 3A-3B.

The bottom mold form 40 shown in FIG. 3B provides the secondary groove form 41 and the tread wear indicator form 42, which fills with rubber during the molding process to form the tread wear indicator 22, as shown in FIG. 2A. The access channel form 32 of the top mold aligns with and fills the gap above the tread wear indicator form 42 as shown in FIG. 3C. The distance between the bottom of the access channel form 32 and the back face form 43 is the distance m 26, which is the minimum allowable tread depth as shown in FIG. 2A.

Figure 4A:
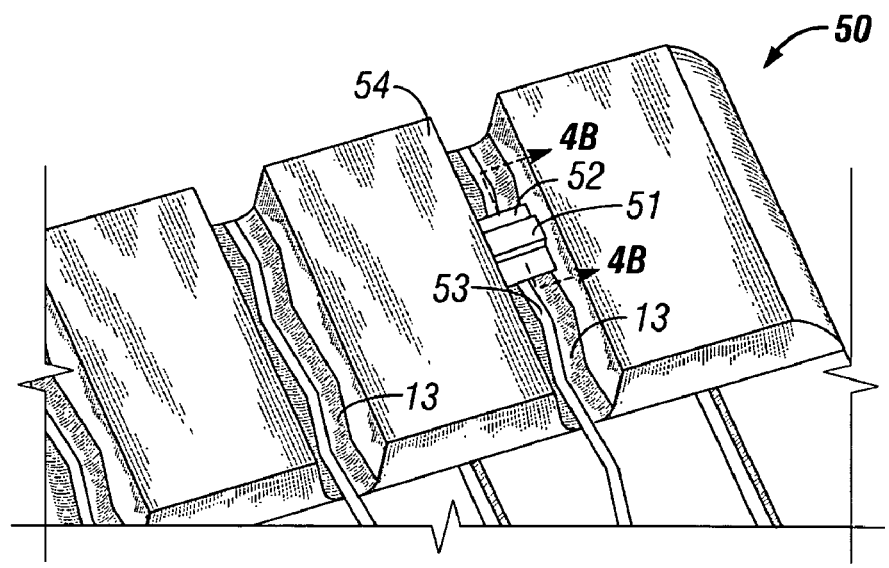
FIGS. 4A-4B are drawings of perspective and cross sectional views of a tread band having a wear indicator molded into a cavity that is open to the front face of the tread band.
Figure 4B:
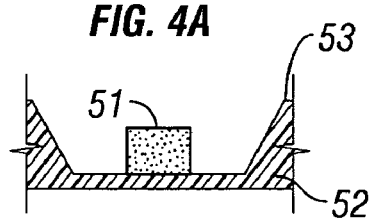

FIGS. 4A-4B are perspective and cross sectional views of a tread band having a wear indicator molded into a cavity that is open to the front face of the tread band. In this embodiment of the present invention, a wear indicator 51 is molded within a cavity 52 that extends from the front face 54 of the tread band 50 to below the bottom 53 of the primary grooves 13. As shown in FIG. 4B, the top surface of the wear indicator 51 lies below the bottom surface 53 of the primary grooves 13.

Figure 5:
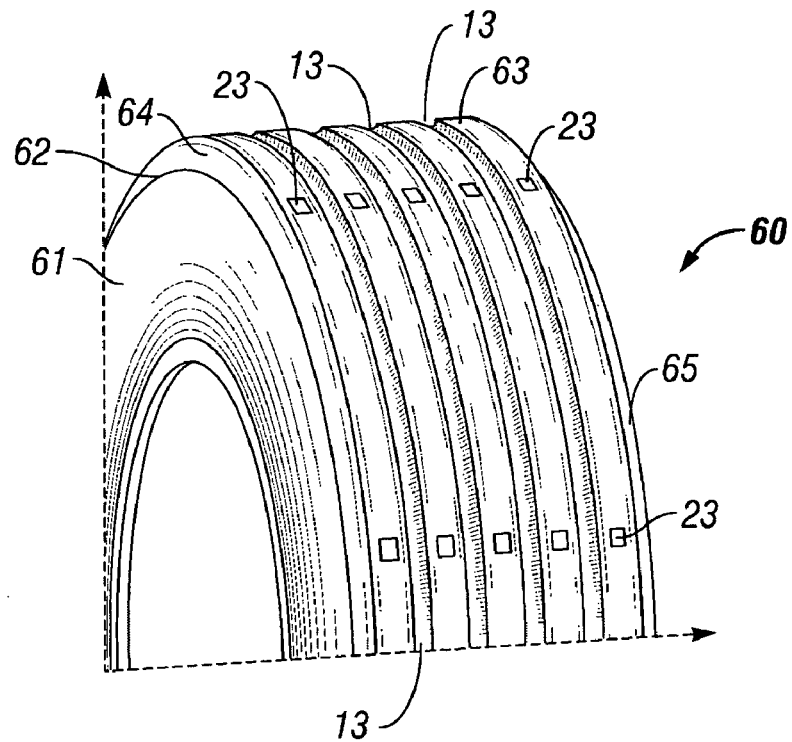
FIG. 5 is a drawing of a perspective view of a portion of a retread tire having a tread band in accordance with the present invention.

FIG. 5 is a drawing of a perspective view of a portion of a retread tire having a tread band in accordance with the present invention. The portion of the retread tire 60 includes a tire carcass 61 having a crown portion 64 to which the tread band 65 is attached. The tread band 65 is attached to the crown portion 64 with cushion gum 62 as known to those having ordinary skill in the art. The openings into the access channels 23 provide a visual indication that the tire has not worn beyond its allowable minimum tread depth.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. For example, the phrase "a solution comprising a phosphorus-containing compound" should be read to describe a solution having one or more phosphorus-containing compounds. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A tread band, comprising:
   a primary groove opening onto a front face of the tread band and a secondary feature molded into the tread band, the secondary feature opening onto at least a back face of the tread band, wherein a bottom of the secondary feature extends to a greater distance radially from the back face than a groove bottom of the primary groove so that the secondary feature bottom is opened to the front face of the tread band prior to disappearance by wear of the primary groove, the opened secondary feature providing groove open volume and depth in the tread;
   a wear indicator molded into a section of an undertread portion of the tread band to provide an end-of-useable-tread indication for the opened secondary feature when the front face of the tread band wears even with a top portion of the wear indicator, wherein the wear indicator is molded into an indicator portion of the secondary feature and extends radially from the back face of the tread band such that the top portion of the wear indicator is below the secondary feature bottom that opens to the front face of the tread band prior to disappearance by wear of the primary groove, wherein the tread band portion between the top portion of the wear indicator and the secondary feature bottom provides tread depth above the end-of-useable tread indication.

2. The tread band of claim 1, wherein the section of the undertread portion extends less than about 4 mm from the back face of the tread band.

3. The tread band of claim 1, wherein the section of the undertread portion extends less than about 3 mm from the back face of the tread band.

4. The tread band of claim 1, wherein the section of the undertread portion extends less than about 1.5 mm from the back face of the tread band.

5. The tread band of claim 1, wherein the wear indicator is molded into a plurality of secondary features at the same circumferential location so that a lateral bar comprising a top portion of the wear indicator forms across the tread band as the end-of-usable-tread indication.

6. The tread band of claim 1, further comprising:
an access channel opening from the front face of the tread band and extending radially to a top surface of the wear indicator, wherein the access channel is in fluid communication with the indicator portion of the secondary feature.

7. The tread band of claim 6, wherein the access channel is not in fluid communication with adjacent portions of the secondary feature that are separated from the indicator portion by a barrier.

8. The tread band of claim 6, wherein the access channel is between about 4 mm and 6 mm wide.

9. The tread band of claim 6, wherein the wear indicator molded into the indicator portion of the secondary feature is less than about 12 mm wide.

10. The tread band of claim 1, wherein the tread band is cured rubber.

11. The tread band of claim 1, wherein the tread band is uncured rubber:

12. A tire, comprising:
a tire carcass having a crown portion;
a tread band bonded to the crown portion of the tire carcass, wherein the tread band comprises:
a primary groove opening onto a front face of the tread band and a secondary feature molded into the tread band, the secondary feature opening onto at least a back face of the tread band, wherein a bottom of the secondary feature extends to a greater distance radially from the back face than a groove bottom of the primary groove so that the secondary feature bottom is opened to the front face of the tread band prior to disappearance by wear of the primary groove, the opened secondary feature providing groove open volume and depth in the tread;
a wear indicator molded into a section of an undertread portion of the tread band to provide an end-of-useable-tread indication for the opened secondary feature when the front face of the tread band wears even with a top portion of the wear indicator, wherein the wear indicator is molded into an indicator portion of the secondary feature and extends radially from the back face of the tread band such that the top portion of the wear indicator is below the secondary feature bottom that opens to the front face of the tread band prior to disappearance by wear of the primary groove, wherein the tread band portion between the top portion of the wear indicator and the secondary feature bottom provides tread depth above the end-of-useable tread indication.

13. The tire of claim 12, wherein the tire carcass is cured and the tread band is uncured.

14. The tire of claim 12, wherein the tread band is stitched to the tire carcass.

15. The tire of claim 14, wherein the tread band is stitched to the tire carcass with a layer of cushion gum rubber.

16. The tire of claim 15, wherein the cushion gum rubber is cured to bond the tread band to the tire carcass.

17. A tread band, comprising:
a primary groove opening onto a front face of the tread band and a secondary feature molded into the tread band, the secondary feature opening onto only a back face of the tread band, wherein a bottom of the secondary feature extends to a greater distance radially from the back face than a groove bottom of the primary groove so that the secondary feature bottom is opened to the front face of the tread band prior to disappearance by wear of the primary groove, the opened secondary feature providing groove open volume and depth in the tread;
a wear indicator molded into a section of an undertread portion of the tread band to provide an end-of-useable-tread indication for the opened secondary feature when the front face of the tread band wears even with a top portion of the wear indicator, wherein the wear indicator is molded into an indicator portion of the secondary feature and extends radially from the back face of the tread band such that the top portion of the wear indicator is below the secondary feature bottom that opens to the front face of the tread band prior to disappearance by wear of the primary groove, wherein the tread band portion between the top portion of the wear indicator and the secondary feature bottom provides tread depth above the end-of-useable tread indication.

* * * * *